Figure 1:
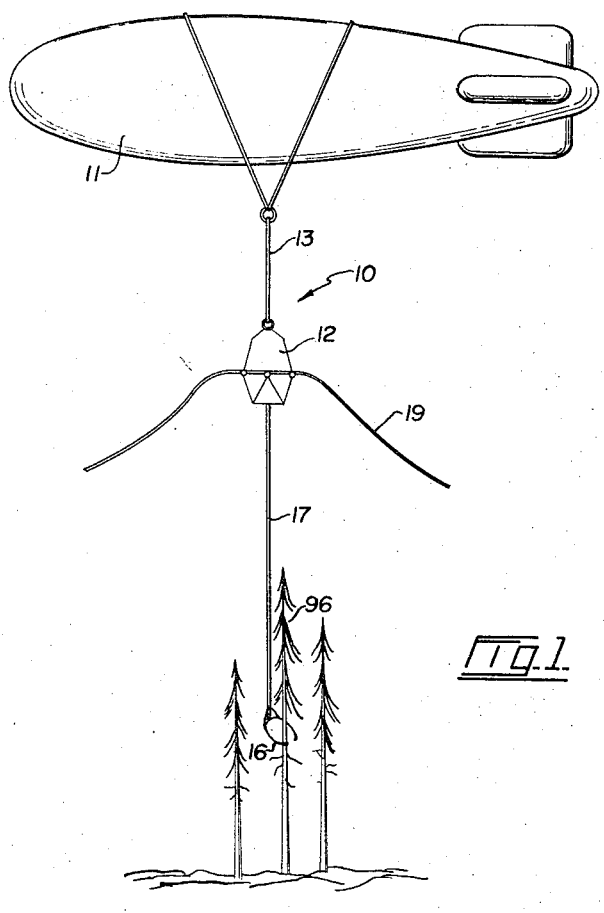

Feb. 20, 1968　　　C. F. MOSHER　　　3,369,673
TREE HARVESTING LIFTING AND TRANSPORTING APPARATUS
Filed Jan. 12, 1965　　　　　　　　　　　　　3 Sheets-Sheet 1

INVENTOR
CLIFFORD F. MOSHER
BY
Fetherstonhaugh & Co.
ATTORNEYS

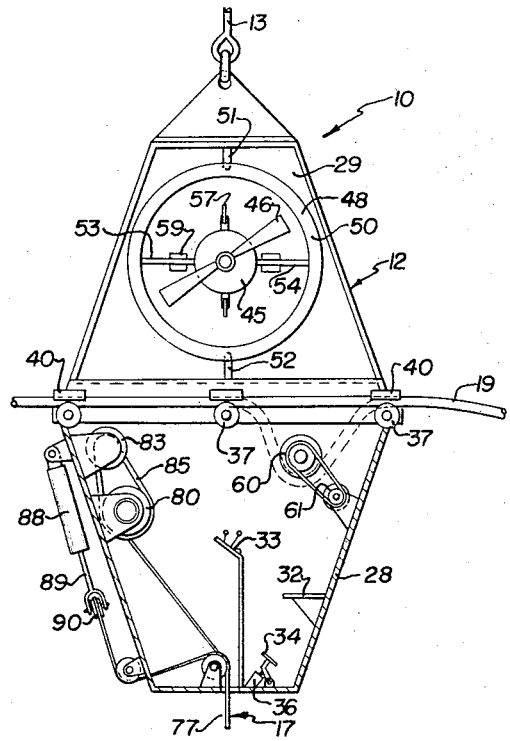
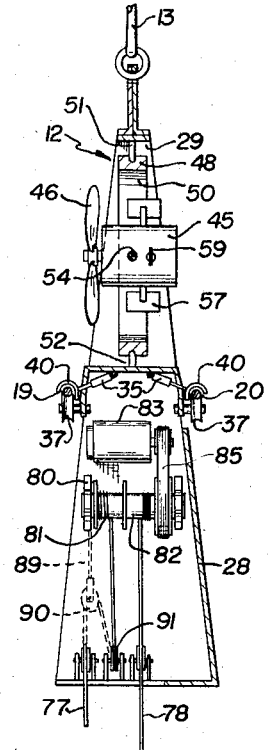
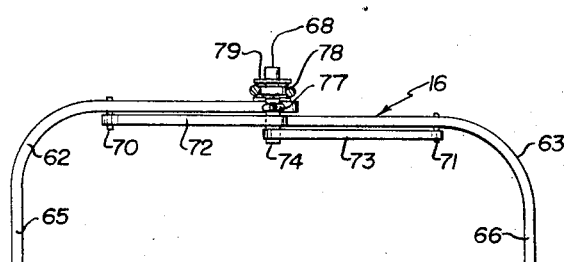
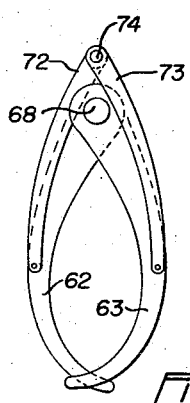
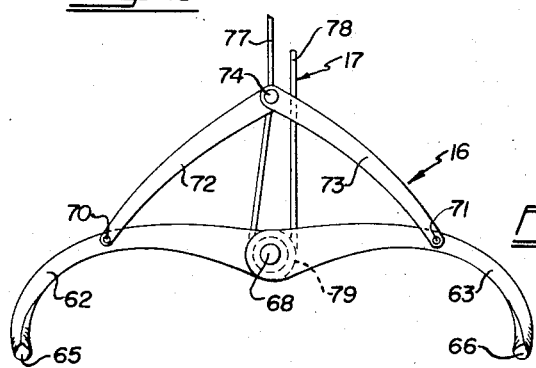

United States Patent Office 3,369,673
Patented Feb. 20, 1968

3,369,673
TREE HARVESTING LIFTING AND
TRANSPORTING APPARATUS
Clifford F. Mosher, 6039 Buckingham St., South Burnaby,
British Columbia, Canada
Filed Jan. 12, 1965, Ser. No. 424,932
9 Claims. (Cl. 212—71)

This invention relates to a method of harvesting trees and to lifting and transporting apparatus for trees and other loads.

With the intense logging operations of the past few years, the supply of trees in readily accessible places is becoming limited. In addition to this, in areas where large timber grows, it has not been economical to cut and bring out small trees. The present method and apparatus make it possible to harvest small trees as well as larger trees, and they make it possible to log in an economical manner areas which are not readily accessible, and/or which may include a large percentage of small trees which would not be brought out with the standard methods and equipment for economical reasons.

Other advantages of the present method and apparatus are as follows:

(1) Breakage has been eliminated which results from the falling of trees on rough ground and steep side hills.

(2) The trees are moved to places where they can be conveniently limbed and accurately cut to desired lengths.

(3) Much difficult and expensive truck road construction over rocky or muddy terrain has been eliminated.

(4) Fire hazard in the woods has been minimized by the elimination of running lines through the trees.

(5) Most slash on the ground has been eliminated, thereby eliminating the necessity of slash burning.

(6) The harvesting method provides good ground conditions for reforestation.

(7) Eliminates the necessity of men working on rough ground under dangerous side hill conditions and near moving trees or logs.

(8) The apparatus lends itself to full production logging on a 24 hour basis through the use of lights mounted on the equipment.

(9) Allows for full 12 month operation as severe winter transportation and summer hazard problems are minimized.

(10) Reduces line wear.

(11) Lends itself to control of the balloon which provides lifting power should said balloon break away from the controlling lines thereof.

The method according to the present invention comprises gripping a tree by gripping means suspended from a motor-driven balloon positioned above the tree, and driving the balloon in a direction away from said tree while retaining the grip thereon to uproot the tree. It is preferable at this time to drive the balloon upwardly and horizontally so that effort is made to pull the tree out of the ground while at the same time levering it sideways to help break the roots out of the ground. However, the balloon may be moved only horizontally at this time. The levering action is helped if the tree is gripped near the top thereof so that relatively great leverage is exerted during the operation. It is desirable to connect the balloon to the ground by cable means adapted to permit limited vertical and horizontal movement of said balloon. In the preferred form of the invention, a cable is laid over a desired area and anchored to the ground at spaced-apart points. The balloon is connected to this cable so that it can move longitudinally thereof.

The apparatus is primarily designed for lifting and transporting trees, but it could be used for other purposes. The apparatus comprises a power-driven balloon having gripping means suspended therefrom adapted to grip a load, such as a standing tree, to be raised and transported by said balloon. This gripping means is preferably in the form of a grapple suspended from the balloon by means adapted to close and open the grapple to grip and release the load. The preferred form of the apparatus includes a carriage suspended from the balloon and movably mounted on a cable which is anchored to the ground at spaced apart points. The carriage can be made large enough to carry an operator, or suitable controls can be installed which are adapted to respond to radio signals in order to perform the functions necessary for proper operation of the apparatus. A motor driven propeller is mounted on the carriage for moving the balloon with its load. This is such that the balloon can be driven horizontally in any direction, and, if desired, such that the balloon can be driven downwardly and upwardly as well. This helps the tree harvesting operation, allows the balloon to be moved longitudinally in both directions along the cable, and the balloon to be moved laterally relative to the cable within the limits of the slack in the cable. The baloon lifts the carriage with its load, and at least a portion of the cable.

A preferred form of apparatus for carrying out the present method and for lifting and transporting trees or other loads is ilustrated in the accompanying drawings, in which, FIGURE 1 is a diagrammatic illustration of the apparatus in operation, FIGURE 2 is an enlarged diagrammatic vertical section through the carriage suspended from the balloon.

Figure 7:
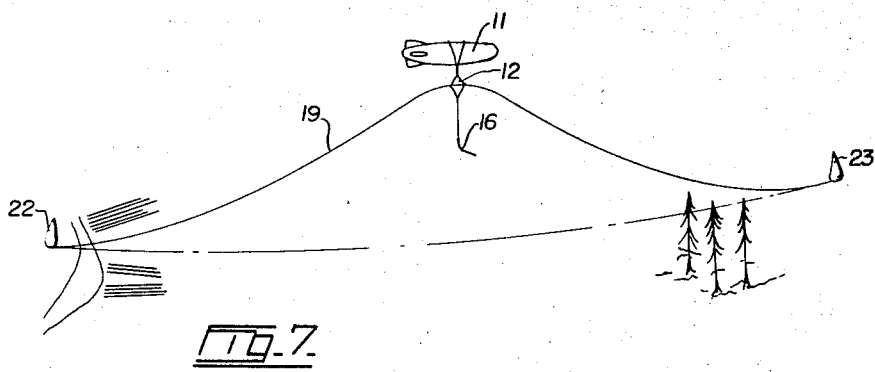
Figure 8:
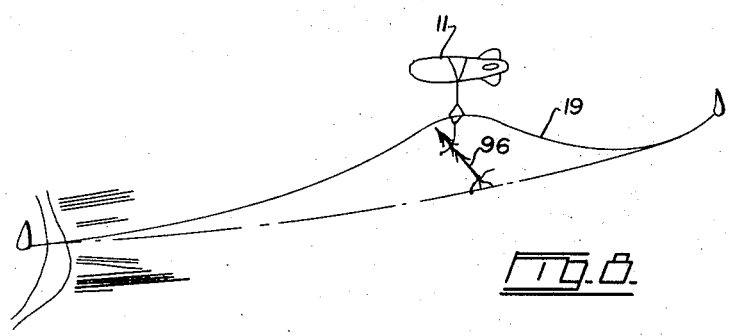
Figure 9:
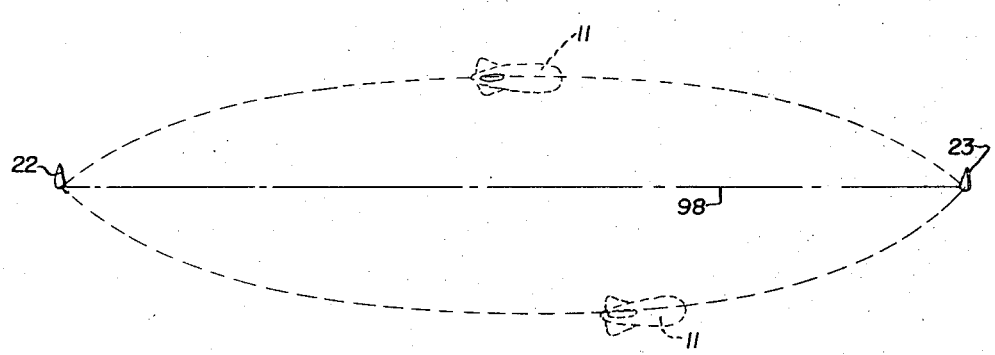

FIGURE 3 is a sectional view through the carriage taken substantialy at right angles to FIGURE 2, FIGURE 4 is a plan view of one form of tongs which may be used with this apparatus, FIGURE 5 is a side elevation of the tongs shown in open position, FIGURE 6 is a view similar to FIGURE 5 with the tongs in the closed position, and FIGURES 7, 8 and 9 are diagrams illustrating the operation of this apparatus.

Referring to FIGURES 1 to 3 of the drawings, 10 is lifting and transporting appartaus comprising a balloon 11 and a carriage 12 suspended therefrom by cable means 13. Suitable gripping means, such as a grapple 16, is suspended from carriage 12 by cable means 17. Although under ideal conditions this apparatus might be used alone, it is preferable to connect balloon 11 to the ground by a cable which will permit the balloon to move vertically and horizontally within certain limits. In the preferred form of the apparatus, carriage 12 rides along one or more cables. In this example, two cables 19 and 20 are used for safety reasons so that if one were to break, the other would still serve its purpose. For the sake of convenience, the apparatus will be mainly described as though only cable 19 is employed. This cable is anchored at its ends at spaced apart points 22 and 23, see FIGURES 7 to 9. Carriage 12 travels along this cable, and there is sufficient slack in the cable to enable balloon 11 to move up and down as well as transversely of the cable.

Carriage 12 includes a base 28 having an open frame 29 mounted on the top thereof, this frame being connected to the cable means 13 suspended from balloon 11. If an operator is to ride the carriage, a seat 32 is provided in base 28 in front of a control panel 33 and a brake pedal 34.

Cables 19 and 20 extend across the top of base 28 and over pulleys 37 rotatably mounted on said base. Brake shoes 40 extend over cables 19–20 at the top of the carriage base, said shoes normally being free of the cables, but being operable by foot pedal 34 to grip the cables. For example, each brake shoe may be supported by the piston rod of a hydraulic cylinder 35 which is controlled by a master cylinder 36 operated by foot pedal 34.

Balloon 11 lifts carriage 10 which, in turn, lift cables 19 and 20. The weight of the carrage and the cables keep the balloon from rising too high. If balloon 11 is moved longitudinally of the cables, pulleys 37 ride along said cables. Movement of the carriage on the cables is prevented when brake shoes 40 grip them.

Movement of the apparatus is accomplished by means of an electric, hydraulic or internal combustion motor 45 which drives a propeller 46, said motor preferably being mounted in a gimbal arrangement 48 so that the motor and propeller can be turned up and down and horizontally relative to carriage 12. In this example, gimbal arrangement 48 includes an outer ring 50 mounted on upper and lower vertical pins 51 and 52 mounted in frame 29, and horizontal pins 53 and 54 which are connected to motor 45 at the longitudinal centre thereof and extend out to ring 48 to which said pins are connected. Motor 45 is turned horizontally on pins 51 and 52 by one or more rudders 57 mounted thereon, see FIGURE 3. The motor is tipped up or down by ailerons 59 projecting laterally therefrom. Rudders 57 and ailerons 59 are operated by suitable cables, not shown, which extend to control levers at panel 53. As controls of this nature are well known in the aircraft industry, they do not require detailed description herein.

If desired, means may be provided in carriage 12 for moving it along cables 19 and 20 in case motor 45 fails. For example, cables 19 and 20 may extend around a drum 60 mounted in the carriage and driven by a suitable power source, such as an internal combustion engine 61.

Grapple 16 can be of fairly standard construction. However, the jaws 62 and 63 thereof are preferably formed with substantially parallel arms 65 and 66 projecting laterally therefrom, see FIGURE 4. In this example, jaws 62 and 63 are hingedly connected to each other at 68, the hinge point 68 being located at the inner or upper ends of these jaws. The jaws are pivotally connected at 70 and 71 to links 72 and 73, said links extending upwardly from the jaws and towards each other and being pivotally connected together at their upper ends at 74, see FIGURE 5. The pivot points 70 and 71 are so located relative to jaws 62 and 63 that when the latter are left free, they open, that is, their lower ends and arms 65 and 66 move away from each other. The weight of the upper portions of the jaws between pivot point 68 and respective pivot points 70 and 71 is sufficient to cause this opening action.

Cable means 17 comprises an opening line 77 and a main or closing line 78. The lower end of opening line 77 is secured to pin 74, whereas the lower end of main line 78 extends around a pulley 79 mounted on pin 68 and up to pin 74, to which it is secured. When grapple 16 is carried by line 77, and line 78 is relaxed, the grapple is open, as shown in FIGURES 4 and 5. On the other hand, when line 77 is relaxed and the weight of the grapple is taken by line 78, pin 68 is drawn upwardly towards pin 74 to close the jaws, see FIGURE 6, to grip an object between the arms 65 and 66 thereof.

Lines 77 and 78 are wound on a common drum 80 which is divided into sections 81 and 82 for lines 77 and 78, respectively. This drum is rotated by a motor 83 which may be an electric motor, an internal combustion engine, or a hydraulic motor driven by a hydraulic system having a pump operated by motor 45. Motor 83 is operatively connected to drum 80 in any suitable manner, such as a belt and pulley arrangement 85, see FIGURE 3.

A cable shortener is provided for line 77. In this example, a hydraulic cylinder 88 is mounted on base 28 and has a piston rod 89 projecting from one end thereof, said piston rod carrying a pulley 90 around which line 77 extends. This line extends upwardly from grapple 16 through the bottom of base 28 over pulley 90 and around another pulley 91 mounted on the base and then up to drum section 81. When the hydraulic control, not shown, or cylinder 88 is operated, rod 89 is retracted to shorten line 77 relative to line 78, or extended to lengthen the former line relative to the latter line.

When drum 80 is rotated to unwind or reel in lines 77 and 78, grapple 16 moves downwardly or upwardly relative to carriage 12. Normally the grapple is carried by line 77, as in FIGURE 5, at which time jaws 62 and 63 are open. This is accomplished by retracting piston rod 89. When the grapple is lowered to a desired position, rod 89 is extended to relax line 77 so that the weight of the tongs is taken by line 78, and this causes jaws 62 and 63 to close, as in FIGURE 6.

The method of harvesting trees is relatively simple, and yet extremely effective. Motor 45 is operated to move balloon 11 along cable 19 by means of propeller 46. When the apparatus is over a tree to be harvested, brake shoes 40 are operated to grip cables 19 and 20, and then drum 80 is unreeled to lower grapple 16 until arms 65 and 66 thereof span the upper part of the tree, see tree 96 in FIGURE 1. The grapple is operated firmly to grip the tree, and then motor 45 is turned and operated to cause balloon 11 to move in a direction substantially horizontally away from the tree. If desired, the motor can be tilted upwardly to lift on the tree at the same time. This action levers the tree laterally to rip the roots thereof out of the ground. When it is free of the ground, the balloon is moved upwardly and/or drum 80 is reeled in to lift grapple 16 and the tree towards carriage 12. The tree may now be moved along cable 19 by means of the balloon to a desired point where it is deposited for limbing and to be cut into desired lengths for maximum log grade recovery.

Balloon 11 lifts carriage 12, tree 96 and at least a portion of the weight of cables 19 and 20. Motor 45 primarily moves the balloon and its load along the cable, although it may provide some lifts as well. If drum 60 is provided, it may be used to move carriage 12 along the cables either to help the pulling of a tree out of the ground or when motor 45 fails.

FIGURES 7 to 9 diagrammatically illustrate the use of aparatus 10 in a logging operation. FIGURE 7 illustrates balloon 11 traveling away from cable end 22 for a load. The balloon may be relatively high above the ground in order to keep grapple 16 clear of any obstacles. FIGURE 8 shows the balloon being moved back towards cable end 22, carrying one or more trees. The trees may be carried clear of the ground, or they may be more or less dragged along the ground. It will be noted that the balloon need lift only part of the weight of cables 19 and 20, since portions thereof lie on the ground.

FIGURE 9, which is a plan view, illustrates how balloon 11 can be moved laterally from the normal center line 98 between anchor points 22 and 23. This permits logging to be done for a reasonable distance on each side of this centre line. The fact that motor 45 can be swivelled to turn propeller 46 laterally relative to the balloon makes this possible.

The size or lifting capacity of the balloon and the power of the motor employed will depend upon the size and type of tree being harvested. For fairly large trees a balloon in the 250 to 500 thousand cubic foot range capable of lifting 10 to 20 thousand pounds would be used. In this case, the power of the motor geared to a propeller wound range from 450 to 700 H.P. A small balloon and less power can be used for smaller trees.

What I claim as my invention is:

1. Lifting and transporting apparatus comprising a ballon, a carriage suspended from the balloon, a cable connected to the carriage and anchored to the ground at spaced apart points and adapted to permit limited vertical and horizontal movement in an area between said spaced points of the carriage and balloon, power driven means mounted on the carriage capable of driving said carriage horizontally in all directions and vertically, during which time the balloon moves respectively horizontally and vertically, and gripping means suspended from the carriage adapted to grip a load to be raised and transported by said balloon.

2. Apparatus as claimed in claim 1 in which the cable is connected to the ground at spaced apart points, and the carriage is connected to said cable by bearing means riding along said cable.

3. Apparatus as claimed in claim 1 in which the gripping means comprises a grapple suspended from the carriage by cable means operable to open and close said grapple, and including power means on the carriage and conected to said cable means for raising and lowering the grapple relative to the carriage.

4. Lifting and transporting apparatus comprising a cable anchored to the ground at spaced apart points, a carriage mounted on the cable for movement longitudinally thereof, a balloon connected to the carriage adapted to lift the carriage and at least a portion of the cable above the ground, power means mounted on the carriage for moving the carriage along the cable and the carriage and cable in directions transversely of said cable, and gripping means suspended from the carriage adapted to grip a load to be raised and transported by said balloon.

5. Apparatus as claimed in claim 4 including brake means on the carriage operable to grip said cable to prevent movement of the carriage therealong.

6. Lifting and transporting apparatus comprising a cable anchored to the ground at spaced apart points, a carriage mounted on the cable for movement longitudinally thereof, a balloon connected to the carriage adapted to lift the carriage and at least a portion of the cable above the ground, power means mounted on the carriage for moving the carriage along the cable and the carriage and cable in directions transversely of said cable, a grapple, and cable means suspended from the carriage and connected to said grapple adapted to open and close the latter to cause the grapple to grip and release a load to be raised and transported by said balloon.

7. Apparatus as claimed in claim 6 including power operated means on the carriage and connected to said cable means for lowering and raising the grapple relative to the carriage.

8. Apparatus as claimed in claim 4 in which the carriage comprises a base, and including at least one pulley on the base over which the cable extends, a brake shoe on the base positioned above the pulley, and means selectively operable to move the brake shoe against the cable extending over the pulley to grip said cable.

9. Apparatus as claimed in claim 4 in which the power means comprises a gimbal arrangement mounted on the carriage, and a motor operatively connected to a propeller and mounted in said gimbal arrangement, whereby the thrust created by the propeller can be directed in any desired direction.

References Cited

UNITED STATES PATENTS

| | | | |
|---|---|---|---|
| 306,442 | 10/1884 | Tice | 294—118 X |
| 541,102 | 6/1895 | Lomax. | |
| 881,184 | 3/1908 | Halle | 244—96 |
| 1,645,237 | 10/1927 | Henderson | 244—96 |
| 2,297,291 | 9/1942 | Danielson | 294—118 |
| 2,707,008 | 4/1955 | Bannister | 144—34 X |
| 2,916,322 | 12/1959 | Wirkkala | 294—112 |
| 3,221,897 | 12/1965 | Matheson | 212—71 |
| 3,249,237 | 5/1966 | Stewart | 212—89 |
| 3,260,479 | 6/1966 | Eickmann | 104—112 |
| 3,288,397 | 11/1966 | Fitzpatrick | 244—96 X |

FOREIGN PATENTS 846,805   6/1939   France.

OTHER REFERENCES

The Wingfoot Clan: Goodyear Aerospace Corporation, Akron, Ohio, Mar. 12, 1964, vol. 23, No. 6.

ROBERT G. SHERIDAN, *Primary Examiner.*

MARVIN A. CHAMPION, GERALD M. FORLENZA,
*Examiners.*